US012624255B2

(12) United States Patent
Thomas

(10) Patent No.: US 12,624,255 B2
(45) Date of Patent: *May 12, 2026

(54) BIODEGRADABLE PRESSURE SENSITIVE ADHESIVES

(71) Applicant: Bio-Bond, LLC, Peosta, IA (US)

(72) Inventor: Richard W. Thomas, Peosta, IA (US)

(73) Assignee: BIO-BOND, LLC, Peosta, IA (US)

( * ) Notice: Subject to any disclaimer, the term of this patent is extended or adjusted under 35 U.S.C. 154(b) by 815 days.

This patent is subject to a terminal disclaimer.

(21) Appl. No.: 17/796,954

(22) PCT Filed: Mar. 8, 2021

(86) PCT No.: PCT/US2021/016451
§ 371 (c)(1),
(2) Date: Aug. 2, 2022

(87) PCT Pub. No.: WO2021/158687
PCT Pub. Date: Aug. 12, 2021

(65) Prior Publication Data
US 2023/0083844 A1      Mar. 16, 2023

Related U.S. Application Data

(60) Provisional application No. 62/981,725, filed on Feb. 26, 2020, provisional application No. 62/969,997, filed on Feb. 4, 2020.

(51) Int. Cl.
*C09J 7/38*       (2018.01)
*C09J 11/06*      (2006.01)
*C09J 189/00*     (2006.01)

(52) U.S. Cl.
CPC ................ *C09J 7/38* (2018.01); *C09J 11/06* (2013.01); *C09J 189/00* (2013.01); *C09J 2203/334* (2013.01); *C09J 2301/302* (2020.08); *C09J 2489/00* (2013.01)

(58) Field of Classification Search
CPC ... C09J 7/38; C09J 11/06; C09J 189/00; C09J 189/06; C09J 2203/334; C09J 2301/302; C09J 2489/00
See application file for complete search history.

(56) References Cited

U.S. PATENT DOCUMENTS

| | | | |
|---|---|---|---|
| 5,589,528 A | 12/1996 | Bogardy | |
| 5,834,538 A | 11/1998 | deHullu et al. | |
| 11,827,817 B2 * | 11/2023 | Thomas | C09J 189/06 |
| 12,173,198 B2 * | 12/2024 | Thomas | B42C 9/00 |
| 2004/0166231 A1 | 8/2004 | Ortiz De Zaratte | |
| 2004/0166238 A1 | 8/2004 | Nowicki et al. | |
| 2007/0281003 A1 | 12/2007 | Fuisz et al. | |
| 2008/0233405 A1 * | 9/2008 | Dronzek, Jr. | B65C 9/22 |
| | | | 524/22 |
| 2012/0282335 A1 | 11/2012 | Venkatesh | |

| | | | |
|---|---|---|---|
| 2014/0144579 A1 | 5/2014 | Brown et al. | |
| 2014/0200193 A1 | 7/2014 | Cueto García | |
| 2015/0005174 A1 | 1/2015 | Boseki | |
| 2017/0174958 A1 | 6/2017 | Yang et al. | |
| 2018/0280304 A1 | 10/2018 | Uramatsu | |
| 2021/0107263 A1 | 4/2021 | Bartolucci | |
| 2023/0083844 A1 | 3/2023 | Thomas | |

FOREIGN PATENT DOCUMENTS

| | | |
|---|---|---|
| DE | 10261786 | 7/2004 |
| EP | 1462499 | 9/2004 |
| GB | 2138823 | 10/1984 |
| JP | H10503519 | 3/1998 |
| WO | WO2005073331 | 8/2005 |
| WO | WO2014163916 | 10/2014 |
| WO | WO2020163429 | 8/2020 |

OTHER PUBLICATIONS

Indian Patent Application No. 202117039804. First Examination Report dated Jan. 16, 2023.
Dorr et al. "Bond Strength of Biodegradable Gelatin-Based Wood Adhesives." Aug. 2015.
PCT/US20/16718. International Search Report dated May 12, 2020.
PCT/US21/41587. International Search Report dated Oct. 26, 2021.
European Patent Application No. 20752350.7. European Search Report and Written Opinion dated Feb. 9, 2022.
PCT/US21/016451. International Search Report dated Jul. 1, 2021.

* cited by examiner

*Primary Examiner* — Scott R. Walshon
(74) *Attorney, Agent, or Firm* — Cisto & Thomas LLP

(57)                ABSTRACT

A biodegradable pressure sensitive adhesive includes:

| | % (Parts) |
|---|---|
| Water: | 15-37 |
| Defoamer: | .000-1.0 |
| Sodium Chloride (NaCl): | .000-15.0 |
| Gelatin: | 14-26 |
| Glycerin/UREA: | 6-18 |
| Vanilla Extract: | .000-.700 |
| Sugar/Corn Syrup: | 22-42 |
| Preservative: | .000-.7 |
| TOTAL: | 100.00% | and more particularly:

| | % (Parts) |
|---|---|
| Water: | 15-30 |
| Defoamer: | .3-1.0 |
| Sodium Chloride (NaCl): | 9-15.0 |
| Gelatin: | 15-26 |
| Glycerin: | 6-16 |
| Vanilla Extract: | .000-.250 |
| Sugar/Corn Syrup: | 24-40 |
| Preservative: | .2-.6 |
| TOTAL: | 100.00%. |

15 Claims, No Drawings

BIODEGRADABLE PRESSURE SENSITIVE ADHESIVES

CROSS-REFERENCE TO RELATED APPLICATIONS

The present application claims the benefit of PCT Application No. PCT/US2021/06451, titled "Biodegradable Pressure Sensitive Adhesives," filed Mar. 8, 2021, which claims the benefit of U.S. Provisional Patent Application Nos. 62/969,997 filed Feb. 4, 2020, and 62/981,725 filed Feb. 26, 2020. The contents of which are incorporated by reference herein in their entirety.

SUMMARY

Disclosed are natural based biodegradable adhesives. By being biodegradable, the these adhesives allow the materials with which they are used to be recyclable, repulpable and/or compostable, which can substantially increase the value of such materials once used, as well as provide a more green and more environmentally sustainable repurposing of the used materials.

A biodegradable adhesive is disclosed for use in at least one chosen from non-woven pressure sensitive adhesive (also PSA) applications for baby diapers, tapes, permanent labels, removable labels, reclosable labels, envelopes, medical products, security bags, insect sticky traps, bandages, feminine hygiene products and adult incontinence products. Such adhesive is applicable to post press permanent and non-permanent bonding finishing adhesive applications to include: in-line and off-line folding units and mailing production by non-contact heated nozzle application on folding and direct mailing machines, that includes, most gluing activities performed on printed materials after printing. These applications include:

Mailings;

Folding Cartons;

Envelopes;

Cards (credit card attachment);

Product samples;

Self mailers;

Closing dots;

Swirl spray;

Auxiliary gluing;

Folding;

Gluing;

Corrugated Boxes;

Fugitive Adhesive (also known as "Booger Glue").

These adhesives are also applicable to all types of paper seam non-contact heated nozzle gluing (i.e., folding cartons & corrugated boxes) paper converting applications.

These adhesives solve long held paper recycling mill-related problems connected with the use of non-bio-based cold glues & various forms of hot melt based adhesives, to include pressure sensitive adhesives. Also, contamination in recycled paper due to wax, plastic or petroleum adhesives (often referred to as stickies) can be reduced or eliminated when using the present adhesive because it biodegrades into the paper pulp. The adhesives listed below are suitable for use in all current permanent and non-permanent pressure sensitive adhesive applications and includes the following adhesive:

|  | % (Parts) |
| --- | --- |
| Water: | 15-37 |
| Defoamer: | .000-1.0 |
| Sodium Chloride (NaCl): | .000-15.0 |
| Gelatin: | 14-26 |
| Glycerin/UREA: | 6-18 |
| Vanilla Extract: | .000-.700 |
| Sugar/Corn Syrup: | 22-42 |
| Preservative: | .000-.7 |
| TOTAL: | 100.00% |
| Viscosity: | 450-3000 cps. |
| Refracted Solids: | 62-80% |

Further more specific adhesives include the following:

|  | % (Parts) |
| --- | --- |
| Water: | 15-30 |
| Defoamer: | .3-1.0 |
| Sodium Chloride (NaCl): | 9-15.0 |
| Gelatin: | 15-26 |
| Glycerin: | 6-16 |
| Vanilla Extract: | .000-.250 |
| Sugar/Corn Syrup: | 24-40 |
| Preservative: | .2-.6 |
| TOTAL: | 100.00% |
| Viscosity: | 1500-3000 cps. |
| Refracted Solids: | 62-80% | and

|  | % (Parts) |
| --- | --- |
| Water: | 23.497 |
| Defoamer: | .67 |
| Sodium Chloride (NaCl): | 12.0 |
| Gelatin: | 20.45 |
| Glycerin: | 11.00 |
| Vanilla Extract: | .003 |
| Sugar/Corn Syrup: | 32.00 |
| Preservative: | .38 |
| TOTAL: | 100.00% |
| Viscosity: | 2,500 cps., ± 500 cps. |
| Refracted Solids: | 74.0% ± 3% | and

|  | % (Parts) |
| --- | --- |
| Water: | 23.497 ± 5% |
| Defoamer: | .67 ± 5% |
| Sodium Chloride (NaCl): | 12.0 ± 5% |
| Gelatin: | 20.45 ± 5% |
| Glycerin: | 11.00 ± 5% |
| Vanilla Extract: | .003 ± 5% |
| Sugar/Corn Syrup: | 32.00 ± 5% |
| Preservative: | .38 ± 5% |
| TOTAL: | 100.00% |
| Viscosity: | 2.500 cps., ± 500 cps. |
| Refracted Solids: | 74.0% ± 3% | and

| | % (Parts) |
|---|---|
| Water: | 23.497 ± 2% |
| Defoamer: | .67 ± 2% |
| Sodium Chloride (NaCl): | 12.0 ± 2% |
| Gelatin: | 20.45 ± 2% |
| Glycerin: | 11.00 ± 2% |
| Vanilla Extract: | .003 ± 2% |
| Sugar/Corn Syrup: | 32.00 ± 2% |
| Preservative: | .38 ± 2% |
| TOTAL: | 100.00% |
| Viscosity: | 2.500 cps., ± 500 cps. |
| Refracted Solids: | 74.0% ± 3% | and

| | % (Parts) |
|---|---|
| Water: | 21.00 |
| Defoamer: | .67 |
| Sodium Chloride (NaCl): | 12.0 |
| Gelatin: | 22.947 |
| Glycerin: | 11.00 |
| Vanilla Extract: | .003 |
| Sugar/Corn Syrup: | 32.00 |
| Preservative: | .38 |
| TOTAL: | 100.00% |
| Viscosity: | 2.000 cps. ± 500 cps. |
| Refracted Solids: | 68% ± 3% | and

| | % (Parts) |
|---|---|
| Water: | 21.00 ± 5% |
| Defoamer: | .67 ± 5% |
| Sodium Chloride (NaCl): | 12.0 ± 5% |
| Gelatin: | 22.947 ± 5% |
| Glycerin: | 11.00 ± 5% |
| Vanilla Extract: | .003 ± 5% |
| Sugar/Corn Syrup: | 32.00 ± 5% |
| Preservative: | .38 ± 5% |
| TOTAL: | 100.00% |
| Viscosity: | 2.000 cps. ± 500 cps. |
| Refracted Solids: | 68% ± 3% | and

| | % (Parts) |
|---|---|
| Water: | 21.00 ± 2% |
| Defoamer: | .67 ± 2% |
| Sodium Chloride (NaCl): | 12.0 ± 2% |
| Gelatin: | 22.947 ± 2% |
| Glycerin: | 11.00 ± 2% |
| Vanilla Extract: | .003 ± 2% |
| Sugar/Corn Syrup: | 32.00 ± 2% |
| Preservative: | .38 ± 2% |
| TOTAL: | 100.00% |
| Viscosity: | 2.000 cps. ± 500 cps. |
| Refracted Solids: | 68% ± 3% | and

| | |
|---|---|
| Water: | 34.54% |
| Defoamer: | .545 |
| Sodium Chloride (NaCl): | 4.91 |
| Gelatin: | 17.09 |
| Glycerin/UREA: | 16.36 |
| Vanilla Extract: | .545 |
| Sugar/Corn Syrup: | 25.465 |
| Preservative: | .545 |
| TOTAL: | 100.00% |
| Viscosity: (Brookfield Model RVT Viscometer at 20-rpm's at 150 F.) | 530 cps. ± 250 cps. |
| Refracted Solids: | 62.5% |

This adhesive particularly applicable as a fugitive plastic adhesive replacement.

and

| | % (Parts) |
|---|---|
| Water: | 34.54 ± 5% |
| Defoamer: | .545 ± 5% |
| Sodium Chloride (NaCl): | 4.91 ± 5% |
| Gelatin: | 17.09 ± 5% |
| Glycerin/UREA: | 16.36 ± 5% |
| Vanilla Extract: | .545 ± 5% |
| Sugar/Corn Syrup: | 25.465 ± 5% |
| Preservative: | .545 ± 5% |
| TOTAL: | 100.00% |
| Viscosity: (Brookfield Model RVT Viscometer at 20-rpm's at 150 F.) | 530 cps. ± 250 cps. |
| Refracted Solids: | 62.5% |

This adhesive particularly applicable as a fugitive plastic adhesive replacement.

and

| | % (Parts) |
|---|---|
| Water: | 34.54 ± 2% |
| Defoamer: | .545 ± 2% |
| Sodium Chloride (NaCl): | 4.91 ± 2% |
| Gelatin: | 17.09 ± 2% |
| Glycerin/UREA: | 16.36 ± 2% |
| Vanilla Extract: | .545 ± 2% |
| Sugar/Corn Syrup: | 25.465 ± 2% |
| Preservative: | .545 ± 2% |
| TOTAL: | 100.00% |
| Viscosity: (Brookfield Model RVT Viscometer at 20-rpm's at 150 F.) | 530 cps. ± 250 cps. |
| Refracted Solids: | 62.5% |

This adhesive particularly applicable as a fugitive plastic adhesive replacement.

and

| | % (Parts) |
|---|---|
| Water: | 31.5% |
| Defoamer: | .545 |
| Gelatin: | 17.25 |
| Glycerin/UREA: | 11.00 |
| Vanilla Extract: | .545 |

-continued

| | % (Parts) |
|---|---|
| Sugar/Corn Syrup: | 38.615 |
| Preservative: | .545 |
| TOTAL: | 100.000% |
| Viscosity: (Brookfield Model RVT Viscometer at 20-rpm's at 150 F.) | 1.000 cps. ± 500 cps. |
| Refracted Solids: | 64.5% |

This adhesive is particularly applicable as a replacement for all types of paper-to-paper plastic safety enhancement adhesives.
and

| | % (Parts) |
|---|---|
| Water: | 31.5 ± 5% |
| Defoamer: | .545 ± 5% |
| Gelatin: | 17.25 ± 5% |
| Glycerin/UREA: | 11.00 ± 5% |
| Vanilla Extract: | .545 ± 5% |
| Sugar/Corn Syrup: | 38.615 ± 5% |
| Preservative: | .545 ± 5% |
| TOTAL: | 100.000% |
| Viscosity: (Brookfield Model RVT Viscometer at 20-rpm's at 150 F.) | 1.000 cps. ± 500 cps. |
| Refracted Solids: | 64.5% |

This adhesive is particularly applicable as a replacement for all types of paper-to-paper plastic safety enhancement adhesives.
and

| | % (Parts) |
|---|---|
| Water: | 31.5 ± 2% |
| Defoamer: | .545 ± 2% |
| Gelatin: | 17.25 ± 2% |
| Glycerin/UREA: | 11.00 ± 2% |
| Vanilla Extract: | .545 ± 2% |
| Sugar/Corn Syrup: | 38.615 ± 2% |
| Preservative: | .545 ± 2% |
| TOTAL: Viscosity: (Brookfield Model RVT Viscometer at 20-rpm's at 150 F.) | 100.000% |
| Refracted Solids: | 64.5% |

This adhesive is particularly applicable as a replacement for all types of paper-to-paper plastic safety enhancement adhesives.

Typical viscosity and refracted solids are also given for the above adhesives.

In the above adhesive formulae, the sugar/corn syrup component can be sugar, corn syrup, a mixture of sugar and corn syrup and/or can include other substitutes. The color of these adhesives is typically a semi translucent gelatin color.

These adhesives are also remoistenable.

Various aspects of the various adhesives and applications described herein can be combined in different manners to create different embodiments.

The adhesives can include water, pure or various blends of gelatins, glycerin, defoamer, and preservative. The gelatins can include blends of amber and opaque colored inedible porcine, bovine, and bone extracted collagen-based gelatins, and can also include pharmaceutical and edible gelatins as well. The gelatins can be presented in various forms, including as granulated, noodles, dust, natural colored hard-shell pharmaceutical capsule gelatin tailings, ground multi-colored hard-shell pharmaceutical capsule gelatin tailings, and various pharmaceutical soft gelatin encapsulation web netting encapsulation waste gelatin tailings blends.

The glycerin can include 99.7% USP Kosher Grade, as well as lesser quality and lower priced grades, including 96.0% technical grade and 88% crude grade. The defoamer can be Solvay USA defoamer. The preservative prevents mold. Vanilla extract can be added to the first basic adhesive to provide a pleasant odor. Other extracts or odorants can also be used. All of the components can be provided in edible form to make an entirely edible product.

The specific percentages of components can be adjusted as necessary depending on a specific use and desired characteristic. All values and ranges within the given ranges are intended to be part of the invention.

Other alternatives can also be provided by varying the percentages of components. One or more of the components can be omitted in alternative adhesive embodiments. Additional components can be added to various embodiments without departing from the scope of the invention.

The adhesives can be gently gravity filtered through a twin 200-micron & 55-micron filter bag system.

This adhesive can be produced in food processing hemispherical bottom mixing kettles (super-mix, no mix dead spots), which provide superior mixing as compared to conventional adhesive production kettles having cone shaped or flat bottoms.

Application equipment may need to be modified to be non-corrosive in the presence of water (i.e., use of stainless steel, coated and/or other non-corrosive types of pumps, screws, modified lids for water drip-down evaporation, valves, heads and nozzles, etc. Also, the glycerin in the composition lubricates adhesive supply unit components, including O-rings. This first basic adhesive has shown an increased heat tolerance.

As advantages, the adhesives are biodegradable and freeze/thaw stable. That is, the adhesive can go through freeze/thaw cycles without substantive degradation. This means that the adhesive does not need to be shipped by heated trucks during winter conditions, a substantial cost savings, and/or, can be shipped year-round, and not just during warmer months. In addition, the adhesive has easy clean-up properties with hot (approximately) 160° F. water. No solvents or caustic chemical cleaners are required.

The adhesive provides stronger, deeper, fiber tearing bonds and problem resolution to widespread tape use related adhesion failure. It can replace pressure sensitive tapes which do not stick well below 30° F. It is unconditionally repulpable and saves money over the use of sealing tapes, plastic corrugated banding materials, stretch wrap, and staples.

The adhesives show long open time workability tack properties with easy warm water clean-up properties with one or both of the first and second basic adhesives discussed above. Typical application methods include extrusion, all forms of non-contact and contact extrusion paper-to-paper line gluing related equipment applications, slot-die, extrusion coat, spray, roller, wheel, dots, stitches, beads. Controlled fiberization swirl spray adhesive application can also be used.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range. To the extent that "about" or "substantively" is used to modify a value, that value is rendered as ±10% and ±2% of the value, respectively, unless otherwise stated.

The invention claimed is:

1. A biodegradable pressure sensitive adhesive, wherein the biodegradable pressure sensitive adhesive comprises:

|  | % (Parts) |
| --- | --- |
| Water: | 15-30 |
| Defoamer: | .3-1.0 |
| Sodium Chloride (NaCl): | 9-15.0 |
| Gelatin: | 15-26 |
| Glycerin: | 6-16 |
| Vanilla Extract: | .000-.250 |
| Sugar or Corn Syrup: | 24-40 |
| Preservative: | .2-.6 |
| TOTAL: | 100.00%. |

2. The biodegradable pressure sensitive adhesive of claim 1, wherein the biodegradable pressure sensitive adhesive comprises:

|  | % (Parts) |
| --- | --- |
| Water: | 23.497 |
| Defoamer: | .67 |
| Sodium Chloride (NaCl): | 12.0 |
| Gelatin: | 20.45 |
| Glycerin: | 11.00 |
| Vanilla Extract: | .003 |
| Sugar or Corn Syrup: | 32.00 |
| Preservative: | .38 |
| TOTAL: | 100.00%. |

3. The biodegradable pressure sensitive adhesive of claim 1, wherein the biodegradable pressure sensitive adhesive comprises:

|  | % (Parts) |
| --- | --- |
| Water: | 23.497 ± 5% |
| Defoamer: | .67 ± 5% |
| Sodium Chloride (NaCl): | 12.0 ± 5% |
| Gelatin: | 20.45 ± 5% |
| Glycerin: | 11.00 ± 5% |
| Vanilla Extract: | .003 ± 5% |
| Sugar or Corn Syrup: | 32.00 ± 5% |
| Preservative: | .38 ± 5% |
| TOTAL: | 100.00%. |

4. The biodegradable pressure sensitive adhesive of claim 1, wherein the biodegradable pressure sensitive adhesive comprises:

|  | % (Parts) |
| --- | --- |
| Water: | 23.497 ± 2% |
| Defoamer: | .67 ± 2% |
| Sodium Chloride (NaCl): | 12.0 ± 2% |
| Gelatin: | 20.45 ± 2% |
| Glycerin: | 11.00 ± 2% |
| Vanilla Extract: | .003 ± 2% |
| Sugar or Corn Syrup: | 32.00 ± 2% |
| Preservative: | .38 ± 2% |
| TOTAL: | 100.00%. |

5. The biodegradable pressure sensitive adhesive of claim 1, wherein the biodegradable pressure sensitive adhesive comprises:

|  | % (Parts) |
| --- | --- |
| Water: | 21.00 |
| Defoamer: | .67 |
| Sodium Chloride (NaCl): | 12.0 |
| Gelatin: | 22.947 |
| Glycerin: | 11.00 |
| Vanilla Extract: | .003 |
| Sugar or Corn Syrup: | 32.00 |
| Preservative: | .38 |
| TOTAL: | 100.00%. |

6. The biodegradable pressure sensitive adhesive of claim 1, wherein the biodegradable pressure sensitive adhesive comprises:

|  | % (Parts) |
| --- | --- |
| Water: | 21.00 ± 5% |
| Defoamer: | .67 ± 5% |
| Sodium Chloride (NaCl): | 12.0 ± 5% |
| Gelatin: | 22.947 ± 5% |
| Glycerin: | 11.00 ± 5% |
| Vanilla Extract: | .003 ± 5% |
| Sugar or Corn Syrup: | 32.00 ± 5% |
| Preservative: | .38 ± 5% |
| TOTAL: | 100.00%. |

7. The biodegradable pressure sensitive adhesive of claim 1, wherein the biodegradable pressure sensitive adhesive comprises:

|  | % (Parts) |
| --- | --- |
| Water: | 21.00 ± 2% |
| Defoamer: | .67 ± 2% |
| Sodium Chloride (NaCl): | 12.0 ± 2% |
| Gelatin: | 22.947 ± 2% |
| Glycerin: | 11.00 ± 2% |
| Vanilla Extract: | .003 ± 2% |
| Sugar or Corn Syrup: | 32.00 ± 2% |
| Preservative: | .38 ± 2% |
| TOTAL: | 100.00%. |

8. A biodegradable pressure sensitive, wherein the biodegradable pressure sensitive adhesive comprises:

|  | % (Parts) |
| --- | --- |
| Water: | 34.54 ± 5% |
| Defoamer: | .545 ± 5% |
| Sodium Chloride (NaCl): | 4.91 ± 5% |
| Gelatin: | 17.09 ± 5% |
| Glycerin or Urea: | 16.36 ± 5% |
| Vanilla Extract: | .545 ± 5% |
| Sugar or Corn Syrup: | 25.465 ± 5% |
| Preservative: | .545 ± 5% |
| TOTAL: | 100.00%. |

9. The biodegradable pressure sensitive adhesive of claim 8, wherein the biodegradable pressure sensitive adhesive comprises:

|  | % (Parts) |
| --- | --- |
| Water: | 34.54 ± 2% |
| Defoamer: | .545 ± 2% |
| Sodium Chloride (NaCl): | 4.91 ± 2% |
| Gelatin: | 17.09 ± 2% |
| Glycerin or Urea: | 16.36 ± 2% |
| Vanilla Extract: | .545 ± 2% |
| Sugar or Corn Syrup: | 25.465 ± 2% |
| Preservative: | .545 ± 2% |
| TOTAL: | 100.00%. |

10. The biodegradable pressure sensitive adhesive of claim 8, wherein the biodegradable pressure sensitive adhesive comprises:

|  | % (Parts) |
| --- | --- |
| Water: | 34.54% |
| Defoamer: | .545 |
| Sodium Chloride (NaCl): | 4.91 |
| Gelatin: | 17.09 |
| Glycerin or Urea: | 16.36 |
| Vanilla Extract: | .545 |
| Sugar or Corn Syrup: | 25.465 |
| Preservative: | .545 |
| TOTAL: | 100.00%. |

11. A biodegradable pressure sensitive, wherein the biodegradable pressure sensitive adhesive comprises:

|  | % (Parts) |
| --- | --- |
| Water: | 31.5 ± 5% |
| Defoamer: | .545 ± 5% |

-continued

|  | % (Parts) |
| --- | --- |
| Gelatin: | 17.25 ± 5% |
| Glycerin or Urea: | 11.00 ± 5% |
| Vanilla Extract: | .545 ± 5% |
| Sugar or Corn Syrup: | 38.615 ± 5% |
| Preservative: | .545 ± 5% |
| TOTAL: | 100.000%. |

12. The biodegradable pressure sensitive adhesive of claim 11, wherein the biodegradable pressure sensitive adhesive comprises:

|  | % (Parts) |
| --- | --- |
| Water: | 31.5 ± 2% |
| Defoamer: | .545 ± 2% |
| Gelatin: | 17.25 ± 2% |
| Glycerin or Urea: | 11.00 ± 2% |
| Vanilla Extract: | .545 ± 2% |
| Sugar or Corn Syrup: | 38.615 ± 2% |
| Preservative: | .545 ± 2% |
| TOTAL: | 100.000%. |

13. The biodegradable pressure sensitive adhesive of claim 11, the biodegradable pressure sensitive adhesive comprises:

|  | % (Parts) |
| --- | --- |
| Water: | 31.5% |
| Defoamer: | .545 |
| Gelatin: | 17.25 |
| Glycerin or Urea: | 11.00 |
| Vanilla Extract: | .545 |
| Sugar or Corn Syrup: | 38.615 |
| Preservative: | .545 |
| TOTAL: | 100.000%. |

14. A method of using a biodegradable pressure sensitive adhesive, comprising:
   providing the biodegradable pressure sensitive adhesive of any of claims 1-12;
   applying the biodegradable pressure sensitive adhesive to a substrate.
15. The method of claim 14, comprising:
   applying the biodegradable pressure sensitive adhesive to the substrate using a slot die applicator, to extrude a flat film of adhesive onto the substrate to reduce time for evaporation of water from the biodegradable pressure sensitive adhesive, thereby reducing set-up time for the biodegradable pressure sensitive adhesive.

\*   \*   \*   \*   \*